C. H. BISSELL.
CASING FOR ELECTRICAL APPLIANCES.
APPLICATION FILED JAN. 13, 1913.

1,268,425.

Patented June 4, 1918.

WITNESSES:
Chas. H. Young
S. Davis

INVENTOR.
Carl H. Bissell
BY
Parsons Hall Bodell
ATTORNEYS

UNITED STATES PATENT OFFICE.

CARL H. BISSELL, OF SYRACUSE, NEW YORK, ASSIGNOR TO CROUSE-HINDS COMPANY, OF SYRACUSE, NEW YORK, A CORPORATION OF NEW YORK.

CASING FOR ELECTRICAL APPLIANCES.

1,268,425.  Specification of Letters Patent.  Patented June 4, 1918.

Application filed January 13, 1913. Serial No. 741,784.

*To all whom it may concern:*

Be it known that I, CARL H. BISSELL, of Syracuse, in the county of Onondaga and State of New York, have invented a new and useful Casing for Electrical Appliances, of which the following is a specification.

This invention has for its object the production of a casing for electrical appliances, which casing is particularly applicable to be used in connection with conduit outlet boxes; and the invention consists in the combinations and constructions hereinafter set forth and claimed.

In describing this invention reference is had to the accompanying drawing in which like characters designate corresponding parts in all the views.

Figure 1:
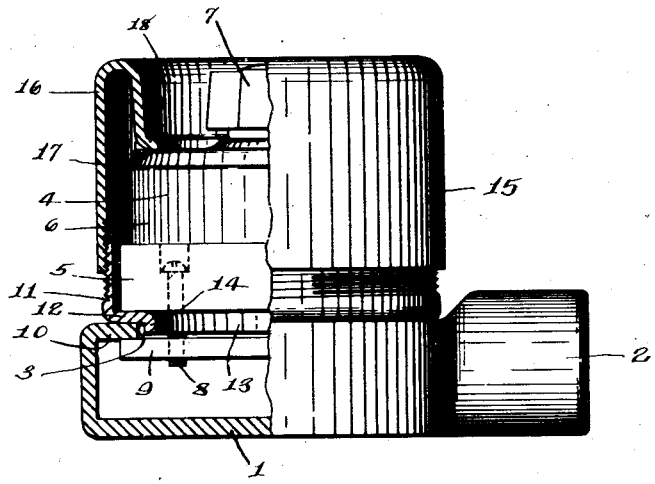
Figure 1 is an elevation, partly in section, of one embodiment of my invention.

1 designates one form of a conduit outlet box having a nipple 2 for connection to an electrical conduit and an opening 3 in one side thereof upon which side an electrical appliance is mounted, the appliance having terminals which are connected to wires within the box, as will be understood by those skilled in the art.

One of the electrical appliances for which the type of box shown herein is applicable is a rotary snap switch.

4 designates an electrical appliance as a snap switch of the usual construction, the same being mounted above the opening 3 and including the usual porcelain base 5, metallic cap 6, and hand piece or button 7 which operates the movable switch arm to make and break the circuits through the terminals on the base 5 which terminals are connected to wires within the box 1 in any well known manner.

As will be understood, in an appliance of this character, the metal cap 6 is retained in place by the button, or hand-piece 7, and upon the removal thereof the cap is liable to become detached and expose the conducting members which it is intended to cover.

The casing for the appliance includes, generally, two sheet metal parts, one forming a base and comprising a bottom wall provided with an opening and a peripheral wall disposed substantially perpendicular to the bottom wall and threaded adjacent its end opposite the latter, and the other forming a cap and comprising parts of dissimilar diameters and a shoulder for coacting with the cap of the appliance for preventing accidental displacement thereof upon the removal of the operating button.

In the form of my invention disclosed herein, the peripheral wall of the base member is designated 11, the bottom wall thereof 12, and the opening in the latter 13. This opening is preferably surrounded by a depending flange, or lip, 14. As shown herein, the bottom 12 is seated upon the outer face of the wall 10 of the outlet box, and the flange or lip 14 extends within the opening 3 and centers the base member in reference to the outlet box so that the openings 3 and 13 will be arranged coaxially. In the illustrated form of the invention, the wall 11 is externally threaded.

Figure 2:
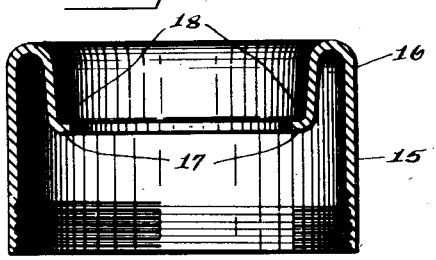
Figs. 2 and 3 are sectional views of the detached base and cap of the casing.
Figure 3:
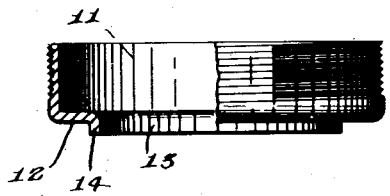

In the embodiment of the invention illustrated in Figs. 1 and 2, the cap of the casing comprises a part 15 threaded internally adjacent one end for engaging the threaded part of the base member and having at its opposite end a part 18 of reduced diameter which at its inner end is provided with a shoulder 17 formed by an inturned portion, or flange. As shown, the wall of the part of smaller diameter is within the end of the part of larger diameter and is formed by an inwardly turned downwardly extending continuation of the wall 15.

Figure 4:
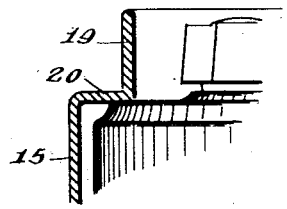
Fig. 4 is a fragmentary sectional view of a snap switch and a modified form of the cap of the casing.

In the form of my invention illustrated in Fig. 4, the part of smaller diameter is formed by a wall 19 constituting an offset upwardly extending continuation of the wall 15 and at its inner end the part 19 is provided with a shoulder 20 formed by the portion of the cap connecting the parts 15, 19.

In assembling the device, the base member of the casing is seated upon the wall 10 of the outlet box as described, and the electrical appliance is seated upon the inner face of the bottom wall 12 of the base, and the parts clamped in position by screws 8 and a bar 9. The bar 9 extends diametrically across the opening 3 in the outlet box and engages at its ends with the under face of the wall 10 of the latter. The screws 8 are provided with heads engaging surfaces in the base 5 of the appliance, and with shanks extending through openings in the base and through the openings 13 and 3, and engaging threaded apertures in the bar or plate 9. After the base of the casing is secured in place with the appliance seated therein, as described, the cap of the casing is secured on the base and is turned down until the shoulder thereof engages with the outer or upper face of the cap 6 of the appliance.

As will be noted, the chambers in the part of the cap of larger diameter and in the base receive the major portion of the appliance and the chamber in the part of the cap of smaller diameter accommodates the button, or operating key 7 of the appliance. The casing thus effectually houses the appliance, while giving access to the key, or button, for permitting the operation thereof, and serves for preventing the displacement of the cap 6 of the appliance should the usual retaining means therefor become displaced.

What I claim is:

1. The combination with an outlet box having an opening through one wall thereof and an electrical appliance, of a casing comprising a base member seated on said wall of the box and provided with an opening registering with the opening in the box and having the appliance seated upon the bottom wall thereof and a cap member detachably connected to the base member and comprising a part extending above and overlying the appliance and engaging the upper face thereof, substantially as and for the purpose described.

2. The combination with an outlet box having an opening through one wall thereof and an electrical appliance associated therewith, of a casing for the appliance comprising a base member having a part interposed between the bottom of the appliance and said wall of the box, and retaining means for securing the appliance to the box and clamping said appliance on the interposed part of the base member, substantially as and for the purpose set forth.

3. The combination with an outlet box having an opening through one wall thereof and an electrical appliance associated therewith, of a casing for the appliance comprising a base member having a part interposed between the bottom of the appliance and said wall of the box, and retaining means for securing the appliance to the box and clamping said interposed part of the base member, the casing also including a cap mounted on the base member having means for engaging the upper face of the appliance and clamping the same toward the bottom of the casing, substantially as and for the purpose described.

4. The combination with an outlet box having an opening through one side wall thereof, and an electrical appliance associated therewith, of a casing for the appliance comprising a base member having a part interposed between the bottom of the appliance and said wall of the box, and a cap member detachably connected to the base member and extending above the appliance, and retaining means for clamping the appliance to the box with said part of the base member interposed, substantially as and for the purpose described.

5. The combination with an outlet box having an opening through one wall thereof, and an electrical appliance, of a casing comprising a base member having a bottom wall seated upon said side wall of the box and having the appliance seated upon the inner face thereof, and provided with an opening registering with that in the outlet box, and a peripheral wall having a threaded portion, and a cap member threaded at one end for engaging the threaded part of the base member, and means for clamping the appliance to the base member and the latter to the box including a plate held in the box and screws extending from the base of the appliance and engaging said plate, substantially as and for the purpose specified.

6. The combination with an outlet box having an opening through one side wall thereof, and an electrical appliance secured to said wall, of a casing comprising a base member mounted on said box and having a peripheral wall and a cap member threading on the base member and inclosing the appliance and extending above the same and having a contracted portion engaging the upper face of the appliance, substantially as and for the purpose specified.

7. The combination with an outlet box having an opening through one side wall thereof, and an electrical appliance secured to said wall, of a casing comprising a base member mounted in said box and having a peripheral wall, and a cap member threading on the base member and inclosing the appliance and extending above the same and having its upper portion extending downwardly and inwardly and engaging at its lower edge with the upper face of the appliance, substantially as and for the purpose set forth.

8. The combination with a conduit outlet box having an opening in one side, of a casing including a cup shaped base for receiving the appliance, the base having a surface for resting on the surface around the opening of the conduit outlet box, and a cap for the base inclosing the upper portion of the appliance and having an opening through which a portion of the appliance is exposed, the cap threading on the base and having a portion extending above the appliance, and forming a depression in which the exposed portion of the appliance is located, the cap also having a surface resting on the upper face of the appliance, in combination with means for clamping the appliance to the box, substantially as and for the purpose set forth.

9. The combination with a conduit outlet box having an opening and an electrical appliance mounted above said opening and held in position by means located within the box, of a casing for the appliance including a base having a portion extending between the base of the appliance and the margin of the wall of the conduit outlet box around the opening, substantially as and for the purpose described.

10. The combination with a conduit outlet box having an opening in one side thereof, of an electrical appliance mounted over said opening, fastening screws associated with the appliance, a casing for the appliance including a base having an opening in its bottom alined with the opening of said box and having its bottom interposed between the base of the appliance and the upper surface of the margin of the wall around the opening of the box, and means located in the box and adapted to coact with the fastening screws of the appliance for clamping the appliance and base of the casing therefor in position, substantially as and for the purpose specified.

11. The combination with a conduit outlet box having an opening in one side thereof, of an electrical appliance mounted over said opening, fastening screws associated therewith, a casing for the appliance including a cup-like base having an opening in its bottom alined with the opening of said box and having at its bottom interposed between the base of the appliance and the upper surface of the margin of the wall around the opening of the box, and a cap threading on the base, and means in the box and adapted to coact with the fastening screws of the appliance for clamping the appliance and base of the casing therefor in position, the cap of the casing projecting above the appliance and having a wall encircling and spaced apart from the axis of the appliance forming a recess in which a portion of the appliance is exposed, the cap also having a surface engaging an upper face of the appliance, substantially as and for the purpose set forth.

In testimony whereof, I have hereunto signed my name in the presence of two attesting witnesses, at Syracuse, in the county of Onondaga, in the State of New York, this 20th day of December 1912.

CARL H. BISSELL.

Witnesses:
  M. E. MAHAR,
  WM. CORNELL BLANDING.